US009386558B2

(12) United States Patent
Hassan et al.

(10) Patent No.: US 9,386,558 B2
(45) Date of Patent: Jul. 5, 2016

(54) RADIO CHANNEL UTILIZATION (71) Applicant: Microsoft Corporation, Redmond, WA (US)

(72) Inventors: Amer A. Hassan, Kirkland, WA (US); Paul W. Garnett, Albany, NY (US); Paul W. A. Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 13/928,382

(22) Filed: Jun. 27, 2013

(65) Prior Publication Data

US 2015/0005021 A1 Jan. 1, 2015

(51) Int. Cl.
*H04W 72/00* (2009.01)
*H04L 27/00* (2006.01)
*H04W 16/14* (2009.01)

(52) U.S. Cl.
CPC ......... *H04W 72/005* (2013.01); *H04L 27/0006* (2013.01); *H04W 16/14* (2013.01)

(58) Field of Classification Search
CPC ............. H04B 3/00; H04N 5/50; H04N 7/01; H03M 1/12; H04W 72/00
See application file for complete search history.

(56) References Cited

U.S. PATENT DOCUMENTS

| 7,042,925 | B2 * | 5/2006 | Shiue | H03G 3/3052 370/509 |
| 7,760,122 | B1 * | 7/2010 | Zortea | 341/155 |
| 8,224,364 | B2 | 7/2012 | Gurney et al. | |
| 2005/0095986 | A1 * | 5/2005 | Hassan et al. | 455/67.13 |
| 2010/0309317 | A1 * | 12/2010 | Wu | H04W 16/14 348/180 |
| 2010/0309806 | A1 | 12/2010 | Wu et al. | |
| 2011/0039495 | A1 | 2/2011 | Sawai et al. | |
| 2011/0090887 | A1 | 4/2011 | Kim et al. | |
| 2011/0280413 | A1 * | 11/2011 | Wu et al. | 381/77 |
| 2012/0201213 | A1 | 8/2012 | Banerjea et al. | |
| 2012/0294168 | A1 | 11/2012 | Freda et al. | |
| 2012/0314088 | A1 | 12/2012 | Li et al. | |
| 2013/0100868 | A1 | 4/2013 | Campbell et al. | |
| 2014/0307565 | A1 * | 10/2014 | Samarasooriya | H04B 1/18 370/252 |

FOREIGN PATENT DOCUMENTS

| EP | 2477432 A1 | 7/2012 |
| WO | 2012053665 A1 | 4/2012 |

OTHER PUBLICATIONS

"International Search Report & Written Opinion for PCT Patent Application No. PCT/US2014/043746", Mailed Date : Oct. 6, 2014, 10 Pages.
"Response to International Search Report and Written Opinion, and PCT Demand under Article 31," Filed Date: Jan. 20, 2015, From PCT Patent Application No. PCT/US2014/043746, 16 pages.
International Preliminary Report on Patentability Mailed Jun. 1, 2015 From PCT Patent Application No. PCT/US2014/043746, 16 pages.

* cited by examiner

*Primary Examiner* — Lewis West
*Assistant Examiner* — Dong-Chang Shiue
(74) *Attorney, Agent, or Firm* — Steve Wight; Sandy Swain; Micky Minhas (57) ABSTRACT

The concepts relate to radio channel utilization and more specifically to determining whether individual radio channels are available for use. One example can obtain a signal on a radio channel. The example can identify that the signal is an occurrence of a licensed use when a power level exceeds a threshold. The example can also determine that the signal is not the occurrence of the licensed use when the power level of the signal and a phase of the signal do not match an expected power level and an expected phase of the occurrence of the licensed use.

20 Claims, 5 Drawing Sheets

RADIO CHANNEL UTILIZATION

BACKGROUND

Ever increasing numbers of wireless devices are being introduced and sold. As such, the radio frequency (RF) spectrum available for these wireless devices to communicate continues to get more and more crowded. More efficient use of the RF spectrum and sharing under-utilized portions of the RF spectrum are very important to meet the growing number of wireless devices. One portion of the RF spectrum that is under-utilized is the portion reserved/licensed for broadcasting, such as television (TV) broadcasting. Governmental regulators divided the TV portion or range (and/or other portions) into a plurality of channels. However, for any given geographic region many of the channels are not utilized for TV or radio broadcasting.

Unused channels or frequencies of the reserved TV portion of the RF spectrum can be referred to as TV white space. It is possible to utilize these TV white spaces for other uses, however, their use tends to be tightly regulated by governmental institutions (such as the Federal Communications Commission in the United States) to ensure that the other uses do not interfere with the regulated broadcast use.

SUMMARY

The described implementations relate to radio channel utilization and more specifically to determining whether individual radio channels are available for use. One example can obtain a signal on a radio channel. The example can identify that the signal is an occurrence of a licensed use when a power level exceeds a threshold. The example can also determine that the signal is not the occurrence of the licensed use when the power level of the signal and a phase of the signal do not match an expected power level and an expected phase of the occurrence of the licensed use.

Another example relates to a device, such as a wireless device, that includes memory and a processor configured to execute instructions stored on the memory. The device can also include wireless circuitry including a receiver and a transmitter configured to receive and send signals over radio channels. The device can further include a communication manager. The communication manager can be configured to cause the receiver to sense for an individual signal on an individual radio channel. The communication manager can also be configured to examine a power of the sensed signal to determine whether the sensed signal is a licensed signal. Stated another way, the communication manager can determine whether the sensed signal is an occurrence of a licensed broadcast use. In an instance that the examination is inconclusive, the communication manager can be further configured to pattern match the sensed signal to an expected profile or pattern of the licensed signal.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio channels/frequencies. Wireless communication is increasing over the radio frequency spectrum. In this document the terms 'channel' and 'frequency' are used interchangeably. Often individual devices can have difficulty finding a channel that they can utilize. The present concepts can allow the device to determine whether an individual channel is available for use. The use of many channels is allocated (e.g. licensed) for broadcast use. Television channels are an example of these allocated channels. The use of TV channels is not allowed if it interferes with the licensed use. Existing techniques for sensing licensed use rely on sensing for a signal on a channel and measuring the gross power of the signal to determine whether the signal is an occurrence of the licensed use (e.g., is the signal a licensed broadcast signal). These techniques have not produced consistently reliable results. The present concepts provide tiered sensing of a channel to determine if the channel is available for use.

The tiered sensing can first employ gross power analysis to a sensed signal. If the gross power analysis conclusively indicates that the signal is a licensed signal then the channel is not used. At that point other channels can be investigated. If the gross power analysis is inconclusive, a second tier of testing can be performed on the received signal. In this case, the second tier of testing can be manifest as pattern matching. The pattern matching can be performed on the signal and known licensed signals. The channel can be used by the device if the pattern matching conclusively shows that the signal does not match the known licensed signals. If the second tier pattern matching is inconclusive, a third tier of more sensitive pattern matching can be performed in an attempt to provide conclusive results.

The present concepts can be applied to any radio channel, such as radio white space channels. One type of radio white space channel relates to the portion of the radio spectrum reserved for television (TV) broadcasting. As used herein a "TV white space channel" means a channel or channel range that was reserved for TV broadcasting, but which is not actually used for TV broadcasting in a particular geographic region. Similarly, "radio white space channel" means a channel or channel range that was reserved for TV broadcasting, for other radio broadcasting, or two-way radio communications, but which is not actually used in such manner in a particular geographic region (at least not at particular times). Stated another way, radio white space can refer to allocated but unused portions of the radio spectrum.

System Examples

Figure 1:
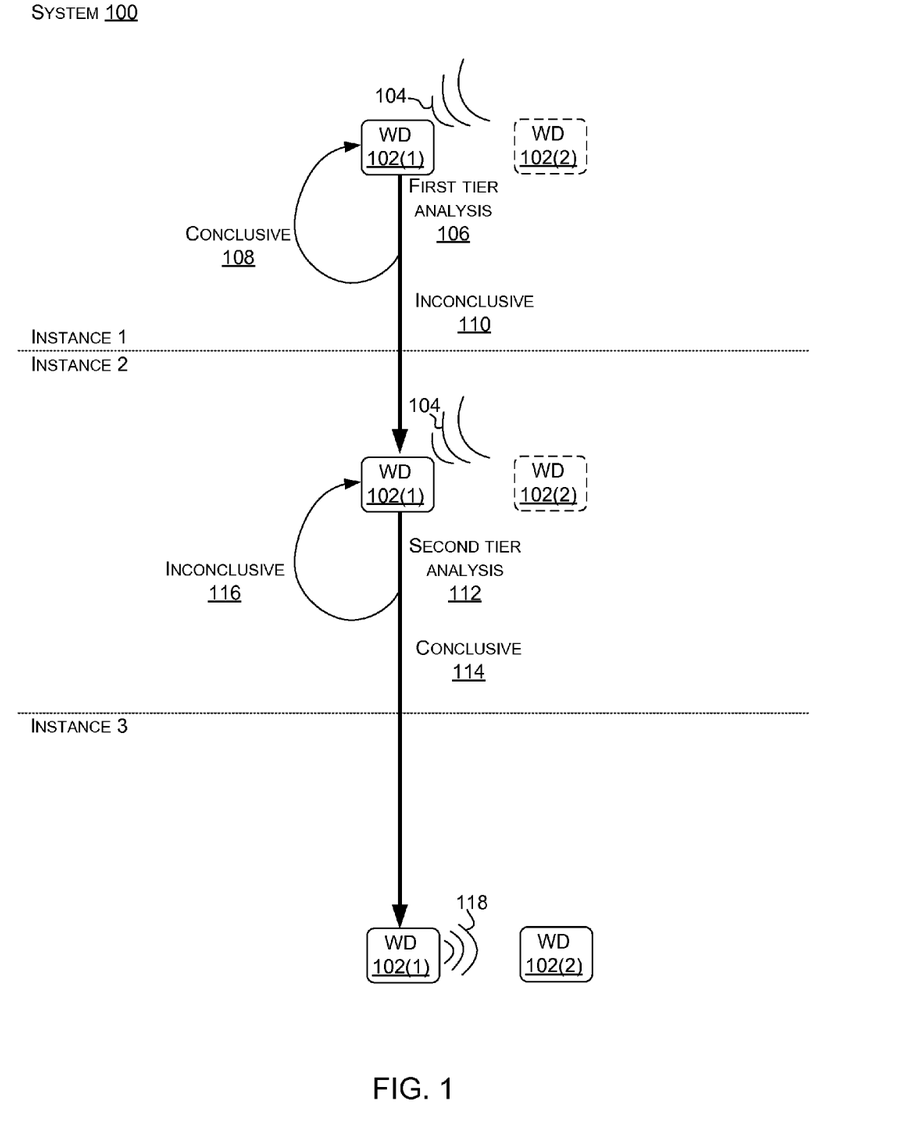
FIGS. 1-2 show examples of systems configured to utilize radio channels in accordance with some implementations of the present concepts.

For purposes of explanation consider introductory FIG. 1, which shows a scenario involving a system 100 that includes a wireless device 102(1). Assume for purposes of explanation, that the wireless device 102(1) is trying to communicate with another wireless device 102(2). The wireless device 102(1) can look for an available radio channel to utilize to communicate with wireless device 102(2). For instance, the wireless device 102(1) can look for an available radio white space channel to utilize for the communication.

At Instance 1, wireless device 102(1) can sense an individual radio white space channel as indicated at 104. (For ease of explanation, the discussion relates to handling individual radio white space channels in a serial manner. However, some implementations can handle multiple radio white space channels in parallel (e.g., sense and analyze multiple channels concurrently)). At this point, wireless device 102(2) is shown in dashed lines to indicate that wireless device 102(1) has not identified a radio white space channel for communicating with wireless device 102(2). At 106, wireless device 102(1) can perform first tier analysis on the sensed signal. In this example, the first tier analysis can be a gross power measurement of the sensed signal of the radio white space channel. Gross power measurement is described in more detail below relative to FIG. 3. In this case, the measured gross power can be compared to a threshold. The threshold can be set at a relatively high value such that exceeding the threshold can be viewed with a high confidence (such as 99%) that the sensed signal is an occurrence of a licensed signal (e.g., licensed use). As such, exceeding the threshold can be seen as a conclusive indicator that the sensed signal is a licensed signal. Accordingly, as indicated at 108, the radio white space channel is not utilized and the wireless device can sense additional radio white space channels for availability. In the alternative, the gross power measurement is inconclusive (e.g., below the threshold) at 110 and processing continues as described relative to Instance 2.

At Instance 2, the wireless device 102(1) can perform second tier analysis 112 on the sensed signal 104. In this case, the second tier analysis can be manifest as pattern matching or signal matching. Pattern matching can be accomplished by comparing the sensed signal 104 to an expected licensed signal. For instance, the wireless device 102(1) can store a copy of expected licensed signals for individual channels. For example, television broadcasts can have a particular profile based upon their power and phase (e.g., expected profile). Similarly, authorized wireless microphone broadcasts/transmissions can have a particular profile based upon their power and phase. The pattern matching can entail pattern matching the sensed signal on an individual channel to the expected licensed signal of the individual channel. Pattern matching is described in more detail below relative to FIG. 3.

The pattern matching can identify a similarity between the two signals (e.g., the sensed signal and the expected licensed signal). The similarity can be used to determine how to proceed. Similar to Instance 1 above, a threshold can be established. In this case, the threshold can be a similarity threshold between the sensed signal and the expected licensed signal. The similarity threshold can be selected to provide a conclusive determination that the sensed signal is not the expected licensed signal. Thus, in the illustrated configuration, the similarity threshold can be selected to identify a lack of similarity. Stated another way, any similarity values below this similarity threshold can indicate that the two signals are not very similar and as such, the sensed signal is conclusively not the expected licensed signal at 114. If the second tier analysis 112 is inconclusive (e.g., above the similarity threshold) as indicated at 116, the second tier analysis can be repeated with a higher resolution sensed signal to attempt to achieve conclusive results. For instance, the higher resolution can be achieved via higher bit rate sampling. This aspect is discussed below relative to FIG. 3.

Instance 3 shows a scenario where the second tier analysis concluded conclusively that the sensed signal is not the expected licensed signal for the individual white space channel. In such a case the individual white space channel can be used without interfering with licensed use. In the illustrated example, wireless device 102(1) is now communicating over the individual radio white space channel with wireless device 102(2) as indicated by transmitted signal 118. Wireless device 102(2) is shown in solid lines to indicate that wireless device 102(1) is now able to communicate with wireless device 102(2) over the individual radio white space channel as desired.

Note that while a single threshold is described relative to Instance 2 for ease of explanation, some implementations can include two (or more) thresholds. The first threshold can be a relatively high threshold and the second threshold can be a relatively low threshold. A similarity the exceeds both thresholds can conclusively indicate that the sensed signal is an occurrence of the licensed signal. A similarity that falls below both thresholds can conclusively indicate that the sensed signal is not an occurrence of the licensed signal. A similarity between the two thresholds can be considered inconclusive.

Note also that for ease of explanation the tiers are described as occurring in a serial manner (e.g., first tier then second tier). However, the tiers could be performed concurrently. For instance, first tier processing and second tier processing could both commence. If the first tier processing provided conclusive results, then the second tier processing could be stopped. Alternatively, the second tier processing could be continued and could be used to verify the results of the first tier processing.

Figure 2:
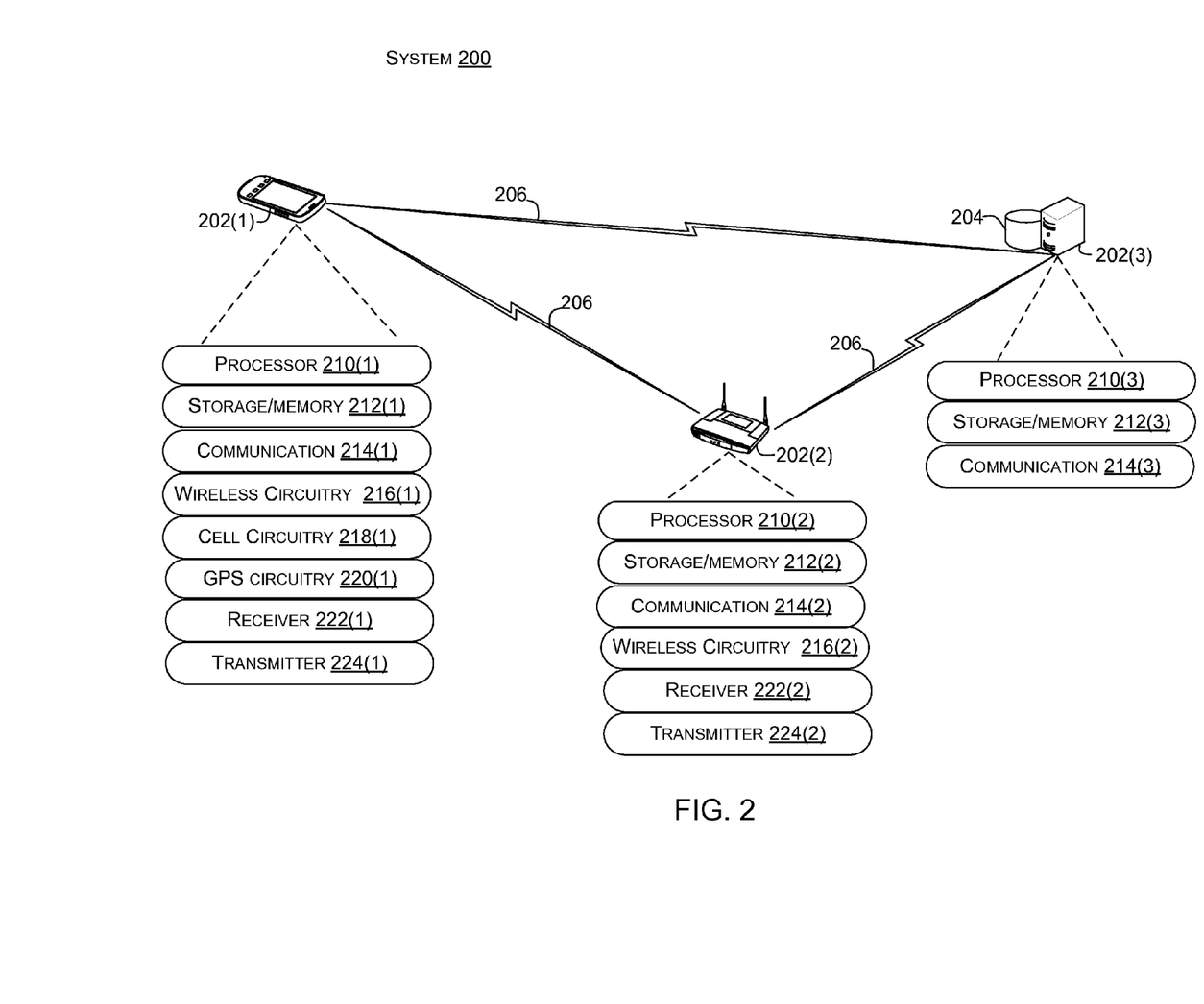

FIG. 2 shows a system 200 that can accomplish tiered sensing concepts described above to identify available radio channels. Further, system 200 can include multiple devices. In the illustrated configuration, a first device is manifest as a mobile device 202(1), such as a smart phone, tablet, etc. A second device is manifest as an access point (AP) 202(2). In this case, the AP 202(2) is embodied as a wireless router. The third device is a computer 202(3), such as a server computer that may be manifest at a defined location or as cloud-based resources. Devices 202(1) and 202(2) can be thought of as examples of wireless devices 102(1) and/or 102(2) described above relative to FIG. 1.

System 200 also includes a broadcast signal profile database 204 that can be accessed by the devices 202(1)-202(3). In the illustrated configuration, the broadcast signal profile database 204 is shown with computer 202(3). In other implementations, the broadcast signal profile database can be independent of, but accessible to, individual devices. Further, the broadcast signal profile database or a subset thereof (e.g., local copy) may be resident on an individual device, such as mobile device 202(1). The above mentioned devices can communicate via one or more networks, as represented by lightning bolts 206.

The devices 202(1)-202(3) can include a processor 210, storage/memory 212, a communication manager or component 214, wireless circuitry 216, cell circuitry 218, GPS circuitry 220, a receiver 222, and/or a transmitter 224. Not all of these elements need occur on each device. Individual devices can alternatively or additionally include other elements, such as input/output devices (e.g., touch, voice, and/or gesture), buses, displays, graphics cards, etc., which are not illustrated or discussed here for sake of brevity.

For ease of explanation, in this discussion the use of a designator with the suffix, such as "(1)", is intended to refer to a specific element instance relative to a specific device. In contrast, use of the designator without a suffix is intended to be generic. Thus, a discussion of processor 210 is intended to be generic to all of the devices 202(1)-202(3), whereas a discussion of processor 210(1) is intended to be specific to mobile device 202(1). Of course, not all device implementations can be illustrated and other device implementations should be apparent to the skilled artisan from the description above and below.

The term "device", "computer", or "computing device" as used herein can mean any type of device that has some amount of processing capability and/or storage capability. Processing capability can be provided by one or more processors (such as processor 210) that can execute data in the form of computer-readable instructions to provide a functionality. Data, such as computer-readable instructions, can be stored on storage, such as storage/memory 212 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected to a network, such as with an Ethernet cable, and wirelessly communicate with devices over radio channels, such as radio white space channels and/or Wi-Fi channels, among others.

In the illustrated implementation, devices 202(1)-202(3) are configured with a general purpose processor 210 and storage/memory 212. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

The communication manager 214 is described in more detail below after the other elements are described.

Wireless circuitry 216 can facilitate communication over various radio channels, such as radio white space channels, Wi-Fi™ channels, Bluetooth™ channels, etc. The cell circuitry 218 can be thought of as a subset of the wireless circuitry relating to cellular channels. The cellular circuitry can handle communications over cell data channels and cell control channels. The GPS circuitry 220 can utilize GPS satellite signals to calculate the device's location.

The receiver 222 and the transmitter 224 can function to transmit and receive data on various channels. For example, the receiver 222 and the transmitter 224 can be configured to operate at specific channels, such as 2.4 Giga Hertz channels, 5.0 Giga Hertz channels, 60 Giga Hertz channels, radio channels, and/or TV channel channels (50 Mega Hertz to 810 Mega Hertz), among others. Alternatively, the transmitters and receivers can be configured to tune to any channels in the RF spectrum. Transmitter 224 can be configured to transmit at a specific power or a range of powers. For instance, the transmitter can be configured to transmit at 0.01 mW or a range of powers from 0 to 0.01 mW. The transmitter can have different power limits for different channels. For instance, a Wi-Fi transmission power limit may be lower than a TV WS power limit. The receiver 222 can be configured to perform the signal sensing 104 of an individual channel described above relative to FIG. 1. This aspect is described in more detail below relative to FIG. 3.

While discrete components or elements are illustrated, some implementations may combine elements. For instance, wireless circuitry 216 may include dedicated receivers and transmitters rather than interfacing with distinct receivers and transmitters 222 and 224, respectively. The wireless circuitry 216, cell circuitry 218, GPS circuitry 220, receiver 222, and/or the transmitter 224 can be hardware based or a combination of hardware and software. The circuitry may utilize a system on a chip (SOC) configuration (described above).

The communication manager 214 can cause the receiver 222 to tune to specific radio channels and sense for signals. The communication manager can also obtain information about licensed signals for the individual channels or groups of channels. For example, in a geographic area, such as the United States or Great Britain, the television broadcast signals may have similar profiles. In such a case, the communication manager can utilize information about a 'generic' TV broadcast signal when evaluating a sensed signal from an individual channel in the TV range.

As mentioned above, the broadcast signal profile database 204 may be stored on an individual device 202, such as on storage/memory 212. Thus, an individual device can be configured to sense individual channels and compare the sensed signals to stored expected licensed signals without communicating with other devices. For instance, device 202(1) could be moved by a user to a new location. The device 202(1) may want to communicate on a radio white space channel. The device 202(1) could begin sensing individual radio white space channels. The device 202(1) could utilize tiered analysis to compare the sensed signals to expected licensed signals for those channels as described above and below.

In an alternative configuration, device 202(3) could at least partially manage device 202(1) and/or another device. For instance, communication manager 214(3) of device 202(3) could send information about expected licensed signals relating to a set of channels to communication manager 214(1). The communication manager 214(3) could also send instructions to communication manager 214(1) to analyze the channels to identify individual channels that are available for use by the device 202(1). In some cases, device 202(3) might be associated with a service provider of the cellular services utilized on device 202(1). As such, communication manager 214(3) may instruct communication manager 214(1) to offload some data communication handled by cell circuitry 218(1) to the identified individual available channels.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted manner that limits the use of the information to accomplishing the present radio channel utilization concepts.

Figure 3:
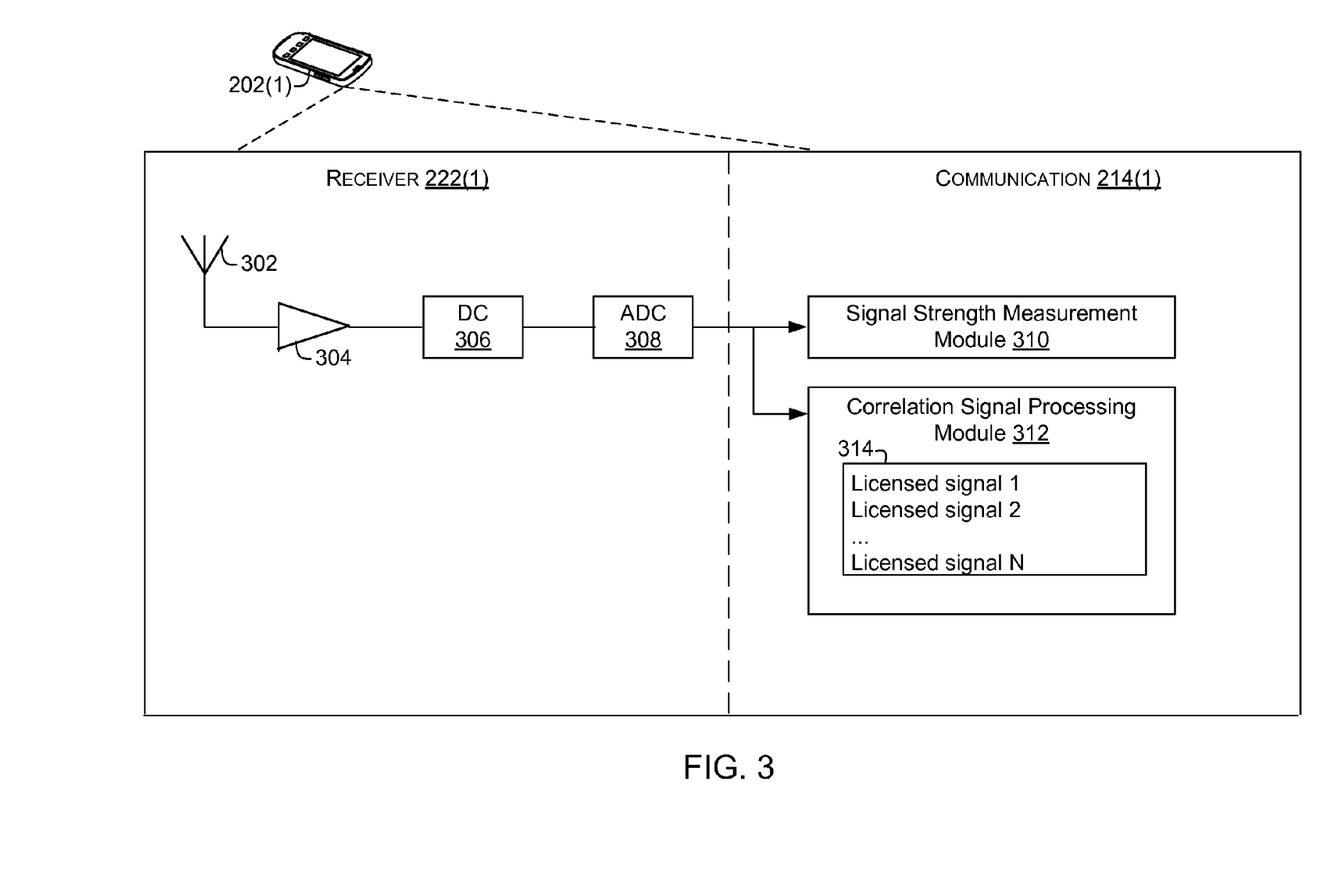
FIG. 3 shows an example of implementation details of a device introduced relative to the system of FIG. 2.

FIG. 3 shows additional detail of one implementation of device 202(1). In this case, receiver 222(1) can include an antenna 302, an amplifier 304, a down converter (DC) 306, and an analog-to-digital converter (ADC) 308. The communication manager 214(1) can include a signal strength measurement module (SSMM) 310 and a correlation signal processing module 312. The boundary between the receiver 222(1) and the communication component 214(1) is shown as a dashed line to indicate that different implementations can allocate individual elements differently. For instance, one implementation could include the signal strength measurement module 310 in the receiver 222(1) rather than the communication manager 214(1). Another implementation could perform the analog-to-digital conversion in the communication manager rather than in the receiver.

In the illustrated configuration, the antenna 302 can sense an individual radio channel. Sensed analog signals from the antenna 302 can be delivered to the down converter 306. The down converter can move the information bearing signal from high frequency to low frequency bands appropriate for processing. Output of the down converter can be delivered to the analog-to-digital converter (ADC) 308.

The ADC 308 can convert the analog signals to digital bits (e.g., digital signal) so that an amplitude of the analog signal at an instance in time is represented by a bit value. The bits can be thought of as a digitized representation of the sensed analog signal. Analog-to-digital conversion can be performed at different bit rates. Higher bit rates can more precisely represent the signal than low bit rates. However, higher bit rate sampling tends to utilize more resources than lower bit rate sampling. In some cases, the ADC 308 can have a fixed bit rate, such as 4 bits. However, in other cases, the ADC can sample at a bit rate selected from a range of bit rates. For instance, the ADC can be configured to sample at rates of 1, 2, 3, 4, 5, 6, 8, 10, 12, and/or 16 bit per sample.

The sample rate can be selected based upon various conditions or parameters. For instance, if the device 202(1) is plugged in, the ADC bit rate may be automatically initiated at a relatively high rate, such as 12 or 16 bit. However, if the device is running on battery power, the device may start at a lower bit rate, such as 3 or 4 bits. In the latter scenario, if the signal is conclusively determined to be a licensed signal or not to be a licensed signal then processing can be stopped. If the results are inconclusive, the sampling can be repeated at a higher bit rate, such as 8 bits. Again, if the results are conclusive the analog-to-digital conversion can be stopped. If the results are inconclusive, the signal can be resampled at an even higher rate, such as 12 or 16 bits.

Returning to the illustrated configuration, the bits from the ADC 308 can be delivered to the signal strength measurement module 310 and the correlation signal processing module 312.

The signal strength measurement module 310 can determine an average gross power of the bits. In one case, the signal strength determination measurement module can analyze the gross power of the bits as a summation of the absolute value of the sensed signal r squared from the lower bound of 1 to the upper bound of n:

$$\Sigma_{i=1}^{n} |r_i|^2$$

The value of the summation can be compared to a threshold energy level (e.g., threshold). The threshold energy level can be purposefully selected as a high value. For instance, the value of threshold energy level can be selected such that meeting or exceeding the threshold energy level creates a very high confidence that the sensed signal is a licensed signal. In one case, the threshold energy level can be selected such that equaling or exceeding the threshold energy level produces a 99% confidence that the sensed signal is an instance of a licensed signal. The communication manager 214(1) can use the comparison as conclusive evidence that the channel is being used by a licensed user. As such, the communication manager can avoid further analysis of the channel and/or use of the channel. Instead the communication manager can search for other channels to use.

The correlation signal processing module 312 can perform signal matching or pattern matching to the bits received from the ADS 308. In this example, the correlation signal processing module 312 can include a local copy 314 of the broadcast signal profile database 204 (FIG. 2). The local copy can include listings of licensed use of individual channels or sets of channels. For instance, the listings could be specific to a geographic or regulatory region in which the device 202(1) is located. For instance, if the device is in the US, the listings could be obtained from the advanced telecommunications systems committee (ATSC). In the UK, the listing can be provided by the broadcasting standards committee (BSC). For a given region, the listings can include information about signals based upon use type. For instance, licensed signal 1 could relate to TV broadcast use and licensed signal 2 could relate to wireless microphone broadcast use. Any type of licensed use can be included, such as emergency channel broadcast use, air traffic channel broadcast use, military channel broadcast use, and/or GPS channel broadcast use, among others.

The correlation signal processing module 312 can compare the bits from the ADC 308 to individual licensed signals 1-N to determine a correlation or similarity between the bits and the licensed use. Stated another way the correlation can indicate the probability that the sensed signal is an instance of the licensed signal. A similarity threshold can be established, such that meeting or exceeding the similarity threshold is highly indicative that the bits represent a licensed use. In some implementations, correlation value (e.g., similarity) of a profile domain can be represented as:

$$\int_0^t r(t) s^x(t) \, dt \rightarrow \sum_{i=1}^n r_i s_i^x$$

In this equation, x represents the bits and s represents the conjugate. The conjugate serves to flip the phase of the signal in the bits. Correlation of the signal profile over time can be represented in the time domain as:

$$r(t) \text{ multiplied by } s(t) \rightarrow \int_0^t dt \text{ multiplied by a bias}$$

In this case, the bias represents a probability of receiving a given signal at a given time. For simplicity sake, the bias can be ignored in some implementations. The correlation can be compared to the similarity threshold. The similarity threshold can be set very high so that equaling or exceeding the similarity threshold is very indicative that the sensed signal is an instance of the licensed signal. In an instance where the similarity threshold is satisfied (e.g., the sensed signal conclusively matches the licensed signal), the communication manager 214(1) can determine that the channel cannot be used and look for other channels to use.

In instances where the correlation falls below the similarity threshold (e.g., is inconclusive) further correlation analysis of the signal can be conducted. For example, the communication manager can cause the ADC to sample the signal at a higher bit rate to generate a refined signal. The resultant bits can be utilized by the correlation signal processing module to refine the correlation.

As mentioned above, in some implementations the correlation signal processing module 312 can employ multiple similarity thresholds. For instance, the correlation signal processing module can employ an upper similarity threshold and a lower similarity threshold. The correlation signal processing module can interpret satisfying both similarity thresholds as conclusive evidence that the sensed signal is an occurrence of the licensed signal. The correlation signal processing module can interpret the similarity falling below both similarity thresholds to be conclusive evidence that the sensed signal is not an occurrence of the licensed signal. The correlation signal processing module can interpret cases where the similarity falls between the two similarity thresholds as inconclusive. In such a case, the correlation signal processing module 312 can request that the ADC 308 repeat the digital conversion at a higher bit rate. As discussed above relative to ADC 308, the higher bit rate can be a more precise or refined representation of the sensed signal.

The correlation signal processing module 312 can generate a refined similarity between the refined digital signal and the licensed signal. The correlation signal processing module can use the refined similarity to attempt to make a conclusive determination about the sensed signal. In cases where a conclusive determination cannot be made, the correlation signal processing module can determine that the channel is not usable. The communication manager 214(1) can then identify additional radio channels for analysis.

Even when a suitable channel is conclusively identified by the communication manager 214(1), the communication manager can cause the receiver to resample the signal. The newly sampled signal can be analyzed by the signal strength measurement module 310 and the correlation signal processing module 312 as described above. The communication manager 214(1) may cause the resampling to be performed periodically and/or when one or more conditions or parameters changes. For instance, the communication manager could cause the resampling to occur every minute during use of the channel by the device 202(1). Alternatively or additionally, the communication manager can cause the resampling to be performed when a condition changes. For instance, the communication manager can cause the resampling to be performed if the device 202(1) is moved. In another example, the communication manager can cause the resampling to be performed if interference levels on the channel rise. For instance, licensed use of some channels can be intermittent. As such, a channel that is clear to use may become unavailable when use commences by the licensed user. Such an occurrence can be detected by the rising interference level and/or the periodic checks causing resampling.

Method Examples

Figure 4:
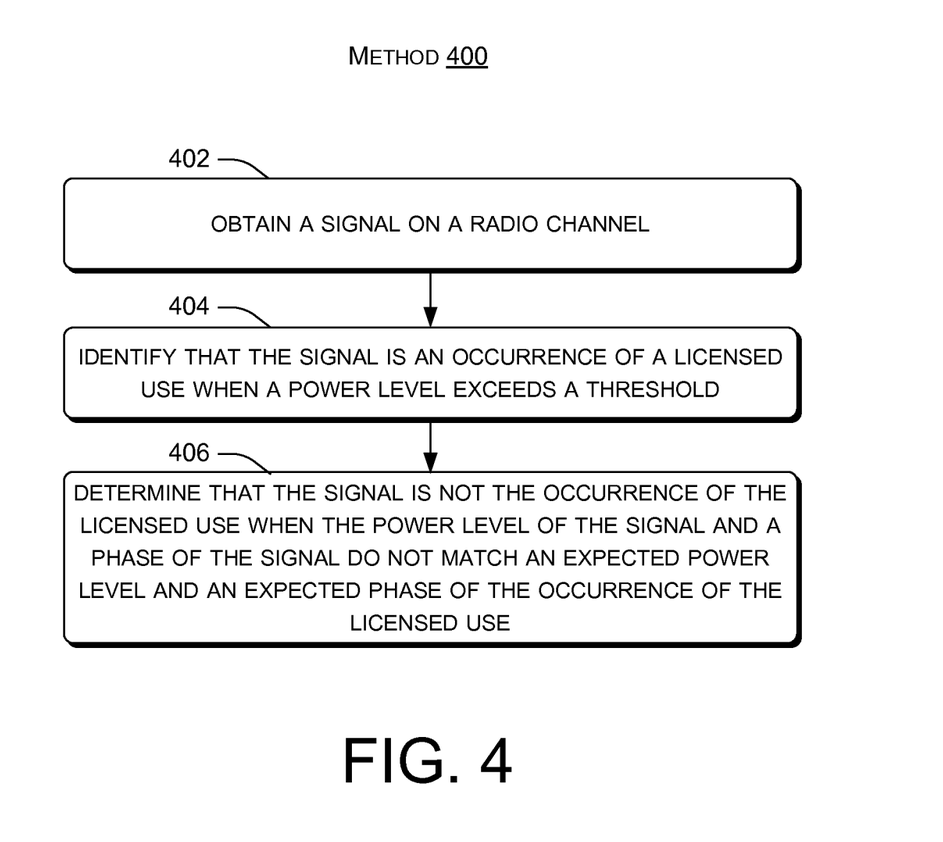
FIGS. 4-5 are flowcharts of examples of radio channel utilization techniques in accordance with some implementations of the present concepts.

FIG. 4 shows a method 400 for utilization of radio channels.

The method can obtain a signal on a radio channel at 402. In one example described above relative to FIGS. 2-3, the obtaining is performed by a receiver. The radio channel can be a white space channel or other type of radio channel.

The method can identify that the signal is an occurrence of a licensed use when a power level exceeds a threshold at 404. Licensed use (e.g., broadcasts) can be at much higher energy levels than can be accomplished (and/or allowed) by other devices, such as wireless access points, routers, smart phones, etc.

The method can determine that the signal is not the occurrence of the licensed use when the power level of the signal and a phase of the signal do not match an expected power level and an expected phase of the occurrence of the licensed use at 406. From one perspective, licensed broadcast signals have known profiles. The determination can leverage the profile information in comparison to the sensed signal. For instance, the determining can entail determining a similarity between the power level of the signal and a phase of the signal relative to the profile information of the licensed use (e.g., an expected power level and an expected phase of the occurrence of the licensed use).

Some implementations can employ a similarity threshold and compare the similarity to the similarity threshold. In one implementation, the method can employ upper and lower similarity thresholds. If the similarity is above both the lower threshold and the upper threshold, the signal can conclusively be determined to be an instance of the licensed use. If the similarity is below the upper threshold and the lower threshold, a conclusive determination can be made that the signal is not an instance of the licensed use. If the similarity is below the upper threshold and above the lower threshold, the determination can be inconclusive. In such a case, signal analysis can be refined and repeated in an attempt to obtain conclusive results.

Figure 5:
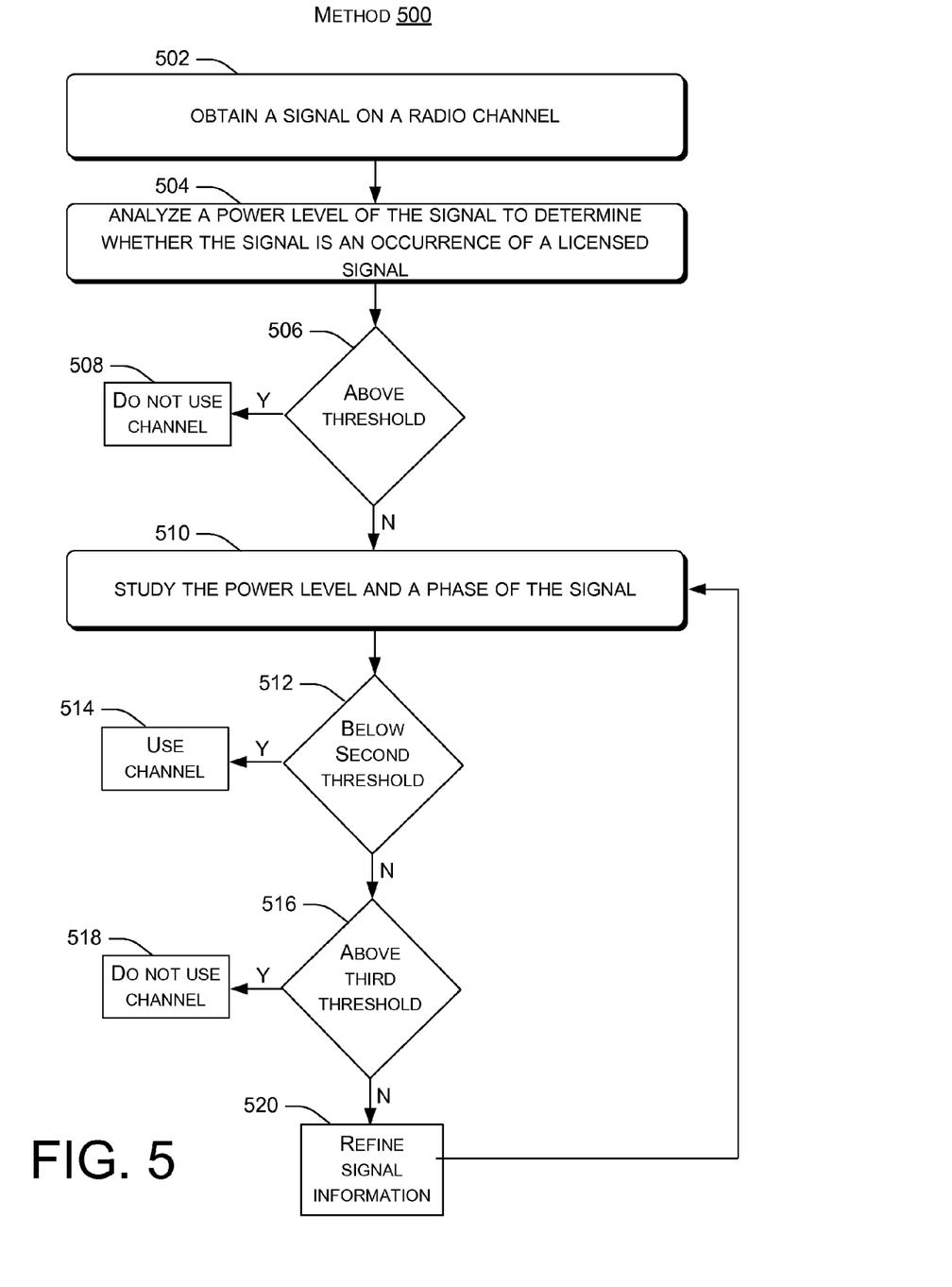

FIG. 5 shows a method 500 for radio channel communications.

The method can obtain a signal on a radio channel at 502.

The method can analyze a power level of the signal to determine whether the signal is an occurrence of a licensed signal at 504. As noted above, licensed uses can employ higher energy levels than other uses and thus in some cases the sampled power level can be definitive in identifying licensed use. For instance, in one implementation, when the output of the receiver that is tuned to a TV channel is 90 dBm, this can be considered conclusive evidence that there is a TV broadcast active on that channel. Alternatively if, the output is below −115 dBm, then it is likely the channel is vacant. This information about the channel can be utilized by itself or verified by pattern matching described below.

At 506, if a confidence in the analysis that a TV broadcast exists on the channel is above a first threshold, then the method proceeds to block 508. At this point, the channel is considered in use by a licensed user and the channel is not used. The first threshold can be set very high so that the results are conclusive.

If the confidence is below the first threshold the method proceeds to 510 which can study the power level and phase of the signal. The studying can produce a second confidence. In some cases, the second confidence can be manifest as a similarity between the obtained signal and a known licensed signal.

At 512 if the second confidence is below a second threshold, then the method can proceed to block 514, otherwise the method proceeds to block 516. Block 514 indicates that the channel can be used for data communication. Stated another way, if the similarity between the obtained signal and the known licensed signal is very low, then the sensed signal is not an occurrence of the licensed signal, and the channel can be used.

At block 516 the second confidence can be compared to a third threshold. If the confidence is above the third threshold, the method proceeds to block 518, otherwise the method proceeds to block 520. Block 518 indicates not to use the channel for data communication. Stated another way, in contrast to the situation above, if the similarity between the obtained signal and the known licensed signal is very high, then the sensed signal is an occurrence of the licensed signal and the channel cannot be used.

Block 520 can refine information about the signal. For instance, the signal can be converted to a digital signal at a higher bit rate that conveys more information about the sensed analog signal. The method can then return to block 510 in an attempt to resolve whether the channel is available for use.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio channels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   obtaining a signal on a radio channel; and
   determining whether the signal is an occurrence of a licensed use via tiered analysis comprising:
   a first tier comprising making a gross power measurement of the signal and comparing the gross power measurement to a threshold energy level,
   a second tier comprising generating an observed pattern similarity between an observed power and phase pattern of the signal and an expected power and phase pattern associated with the licensed use and comparing the observed pattern similarity to at least one power and phase pattern similarity threshold, and
   a third tier comprising resampling the signal and repeating the second tier using the resampled signal,
   wherein the signal is determined to be the occurrence of the licensed use where the gross power measurement exceeds the threshold energy level or where the observed pattern similarity exceeds the at least one power and phase pattern similarity threshold in the second tier or the third tier of the tiered analysis.

2. The method of claim 1, wherein the resampling comprises resampling the signal at a higher resolution.

3. The method of claim 1, further comprising converting the signal to a digital signal and determining the observed pattern similarity between the observed power and phase pattern of the digital signal and the expected power and phase pattern associated with the licensed use.

4. The method of claim 3, further comprising selecting a sampling rate for the converting the signal to the digital signal, the selecting based at least in part on whether a device performing the tiered analysis is connected to a power source or is running on battery power.

5. The method of claim 1, further comprising performing the first tier, the second tier, and the third tier of the tiered analysis sequentially based at least in part on a result of a preceding tier.

6. The method of claim 1, further comprising performing the first tier, the second tier, and the third tier of the tiered analysis concurrently and stopping the tiered analysis based at least on a result obtained from any of the first tier, the second tier, or the third tier.

7. The method of claim 1, further comprising performing the resampling at a higher bit rate in response to inconclusive results obtained from the first tier and the second tier.

8. The method of claim 1, further comprising periodically performing the resampling in response to conditions including:
   a rise in interference levels on the radio channel, and
   movement of a mobile device that obtained the signal.

9. A device, comprising:
   a processor; and
   storage storing computer-readable instructions which, when executed by the processor, cause the processor to:
   receive a signal on a radio channel;
   perform tiered analysis of the signal to determine whether the received signal is a licensed broadcast signal, the tiered analysis comprising:
   comparing a gross power measurement of the received signal to a threshold power level,
   comparing an observed pattern similarity between an observed power and phase pattern of the received signal and an expected power and phase pattern of the licensed broadcast signal to multiple power and phase pattern similarity thresholds, and
   where the comparing the gross power measurement and the comparing the observed pattern similarity are inconclusive, repeating the comparing the observed pattern similarity; and,
   in an instance where the tiered analysis determines that the received signal is the licensed broadcast signal, not transmit on the radio channel, otherwise, transmit on the radio channel.

10. The device of claim 9, wherein the multiple power and phase pattern similarity thresholds comprise an upper power and phase pattern similarity threshold and a lower power and phase pattern similarity threshold.

11. The device of claim 10, wherein:
    comparing the observed pattern similarity indicates that the received signal is the licensed broadcast signal where the observed pattern similarity is above the upper power and phase pattern similarity threshold,
    comparing the observed pattern similarity is inconclusive where the observed pattern similarity is between the upper power and phase pattern similarity threshold and the lower power and phase pattern similarity threshold, and comparing the observed pattern similarity indicates that the received signal is not the licensed broadcast signal where the observed pattern similarity is below the lower power and phase pattern similarity threshold.

12. The device of claim 9, wherein comparing the observed pattern similarity further comprises converting the received signal to a digital signal using a first bit rate sampling, and the repeating the comparing the observed pattern similarity further comprises converting the received signal to a second digital signal using a second bit rate sampling that is higher than the first bit rate sampling.

13. A device, comprising:
   memory and a processor configured to execute instructions stored on the memory;
   wireless circuitry including a receiver and a transmitter configured to receive and send signals over radio channels; and,
   a communication manager configured to cause the receiver to sense for an individual signal on an individual radio channel, the communication manager further configured to use tiered analysis to examine the sensed individual signal to determine whether the sensed individual signal is a licensed signal, the tiered analysis comprising:
   gross power analysis of the sensed individual signal,
   first power and phase pattern matching at a first resolution, and
   second power and phase pattern matching at a second resolution.

14. The device of claim 13, wherein in an instance where the first power and phase pattern matching indicates that the sensed individual signal is not the licensed signal, the communication manager is further configured to stop the tiered analysis and cause the transmitter to communicate data on the individual radio channel.

15. The device of claim 13, further comprising an analog to digital converter (ADC) that is configured to convert the sensed individual signal to a digital signal.

16. The device of claim 15, wherein the ADC is adjustable such that the ADC can convert the sensed individual signal to a relatively low bit digital signal or a relatively high bit digital signal.

17. The device of claim 16, further comprising a battery, and wherein in an instance when the device is on battery power, the communication manager is configured to cause the ADC to default to the relatively low bit digital signal for the first power and phase pattern matching.

18. The device of claim 17, wherein the communication manager is further configured to cause the ADC to resample the sensed individual signal to the relatively high bit digital signal for the second power and phase pattern matching when the first power and phase pattern matching is inconclusive.

19. The device of claim 17, wherein in another instance when the device is connected to a power source other than the battery, the communication manager is configured to cause the ADC to default to the relatively high bit digital signal for the first power and phase pattern matching.

20. The device of claim 13, wherein the communication manager further comprises a correlation signal processing module having information about a set of licensed signals authorized on individual channels, the set of licensed signals including the licensed signal, and the correlation signal processing module is configured to compare a similarity of an observed power and phase pattern of the sensed individual signal to another power and a phase pattern of the licensed signal.

* * * * *